United States Patent
Kwon et al.

(10) Patent No.: US 12,140,523 B2
(45) Date of Patent: Nov. 12, 2024

(54) OPTICAL MEASUREMENT APPARATUS AND OPTICAL MEASUREMENT METHOD

(71) Applicant: SAMSUNG ELECTRONICS CO., LTD., Suwon-si (KR)

(72) Inventors: Deokhyeon Kwon, Hwaseong-si (KR); Jua Ryu, Seongnam-si (KR); Juhyun Park, Seoul (KR); Kidoo Kim, Hwaseong-si (KR); Hyunok Kim, Suwon-si (KR); Sunah Park, Hwaseong-si (KR); Hyunjung Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/815,512

(22) Filed: Jul. 27, 2022

(65) Prior Publication Data
US 2023/0184662 A1    Jun. 15, 2023

(30) Foreign Application Priority Data

Dec. 15, 2021  (KR) .................. 10-2021-0179356
Feb. 4, 2022   (KR) .................. 10-2022-0014729

(51) Int. Cl.
*G01N 15/14*     (2024.01)
*G01N 15/0205*   (2024.01)
(Continued)

(52) U.S. Cl.
CPC .......... *G01N 15/14* (2013.01); *G01N 15/0205* (2013.01); *G01N 15/06* (2013.01); *G01N 15/075* (2024.01); *G01N 2015/1486* (2013.01)

(58) Field of Classification Search
CPC .... G01N 15/14; G01N 15/0205; G01N 15/06; G01N 2015/0693; G01N 2015/1486
See application file for complete search history.

(56) References Cited

U.S. PATENT DOCUMENTS

| 5,467,189 A | 11/1995 | Kreikebaum et al. |
| 5,726,753 A | 3/1998 | Sandberg |

(Continued)

FOREIGN PATENT DOCUMENTS

| CN | 106596439 A | * | 4/2017 | ............. G01N 21/31 |
| CN | 206505011 U | * | 9/2017 | |

(Continued)

OTHER PUBLICATIONS

Dissertation Titled: "Development of Mobile Open-Path Cavity Ring-Down Spectrometer for Measurement of Trace Atmospheric Methane Gas".

*Primary Examiner* — Edmond C Lau
*Assistant Examiner* — Chad Andrew Reverman
(74) *Attorney, Agent, or Firm* — F. Chau & Associates, LLC

(57) ABSTRACT

In an optical measurement method, light is directed from a light generator to a light path cell. A light path is generated by continuously reflecting the light between first and second high reflection mirrors within a light path cell that face to each other. An optical signal is detected from an aerosol sample present within a range of the light path. The optical signal is separated into a particle signal and a gas signal by using a statistical methodology. A particle concentration is calculated from the particle signal by using an assumption of an optical particle counter (OPC). A gas concentration is calculated from the gas signal by using optical characteristic data of gas.

18 Claims, 3 Drawing Sheets

(51) Int. Cl.
*G01N 15/06* (2024.01)
*G01N 15/075* (2024.01)

(56) References Cited

U.S. PATENT DOCUMENTS

| | | |
|---|---|---|
| 6,856,557 B2 | 2/2005 | Kishkovich et al. |
| 7,113,286 B2 | 9/2006 | Yan |
| 8,348,248 B2 | 1/2013 | Hong et al. |
| 9,267,880 B1 * | 2/2016 | Tan .......................... G01J 3/00 |
| 9,989,729 B2 | 6/2018 | Koulikov |
| 10,170,291 B1 * | 1/2019 | Hsu ..................... H01J 49/0422 |
| 10,241,037 B2 * | 3/2019 | Yalin .................. G01N 21/3504 |
| 10,401,296 B1 * | 9/2019 | Muller ................... G01N 21/65 |
| 2005/0122523 A1 | 6/2005 | Yan |
| 2015/0253297 A1 * | 9/2015 | Ning ........................ G01J 3/42 |
| | | 250/341.1 |
| 2017/0284999 A1 * | 10/2017 | Maric .................. G01N 27/127 |
| 2017/0336320 A1 * | 11/2017 | Yalin ...................... G01N 21/39 |
| 2018/0266843 A1 | 9/2018 | Yalin |
| 2018/0306713 A1 * | 10/2018 | Rao ........................ G01N 21/39 |

FOREIGN PATENT DOCUMENTS

| | | | | |
|---|---|---|---|---|
| TW | 202036919 A | * | 10/2020 | ....... H01L 21/02565 |
| WO | WO-2016064897 A1 | * | 4/2016 | ................ G01J 3/42 |
| WO | WO-2019117730 A1 | * | 6/2019 | ............ G01J 3/0205 |
| WO | WO2020172541 | | 8/2020 | |

\* cited by examiner

OPTICAL MEASUREMENT APPARATUS AND OPTICAL MEASUREMENT METHOD

CROSS-REFERENCE TO RELATED APPLICATION

This application claims priority under 35 U.S.C. § 119 to Korean Patent Application No. 10-2021-0179356, filed in the Korean Intellectual Property Office (KIPO) on Dec. 15, 2021, and Korean Patent Application No. 10-2022-0014729, filed in the KIPO on Feb. 4, 2022, the contents of which are herein incorporated by reference in their entirety.

TECHNICAL FIELD

The instant disclosure relates to optical measurement and, more specifically, to an optical measurement apparatus and an optical measurement method.

DISCUSSION OF THE RELATED ART

Spectrometers are used to measure characteristics and concentrations of samples. Spectrometers may analyze these samples through a phenomenon of scattering or absorption by a reaction of light and matter. Some spectrometers include a physical sampling space that is opened to ambient air to minimize the phenomenon by which the sample to be analyzed is adsorbed on a flow path cell. These spectrometers may be called "Open Path Spectrometers". Open path spectroscopy can detect and quantify condensed particles and gas molecules in the atmosphere. Where multiple different substances are detected within the sample, the spectrometer may be able to distinguish the various different substances from one another by separating a mixed signal into independent signals. Then, the signal of the gas molecule can be converted into a concentration of the gas molecule using known optical characteristics. However, it may be difficult to determine a concentration for condensed particles using this approach because the optical characteristic of the condensed particles might not be specified.

SUMMARY

In an optical measurement method, light is cast from a light generator to a light path cell. A light path is generated by continuously reflecting the light between first and second high reflection mirrors of the light path cell that face to each other. An optical signal is detected from an aerosol sample present within a range of the light path. The optical signal is separated into a particle signal and a gas signal by using a statistical methodology. A particle concentration is calculated from the particle signal by using an assumption of an optical particle counter (OPC). A gas concentration is calculated from the gas signal by using optical characteristic data of gas.

An optical measurement apparatus includes a light generator for generating light. A light path cell includes first and second high reflection mirrors that face each other to generate a light path by reflecting the light incident from the light generator. A detector is configured to simultaneously measure a particle concentration and a gas concentration in the light path by using an assumption of an optical particle counter (OPC).

In a method of optical measurement, light is emitted from a light generator. A light path of an open path structure is generated by continuously reflecting the light between first and second high reflection mirrors that are open to an ambient environment. An optical signal is detected from an aerosol sample present within a range of the light path. The optical signal is separated into a particle signal and a gas signal. A particle concentration and optical characteristic of a particle are calculated from the particle signal by using particle concentration data measured by a particle counting device. A gas concentration and optical characteristic of gas are calculated from the gas signal by using gas concentration data measured by a gas concentration measuring device.

In an optical measurement method, light is directed from a light generator to a light path cell. A light path is generated by continuously reflecting the light between first and second high reflection mirrors of the light path cell that face each other. An optical signal is detected from an aerosol sample present within a range of the light path. The optical signal is separated into a particle signal and a gas signal by using a statistical methodology. A particle concentration is calculated from the particle signal by using an assumption of an optical particle counter (OPC). A gas concentration is calculated from the gas signal by using optical characteristic data of gas.

BRIEF DESCRIPTION OF THE DRAWINGS

Example embodiments will be more clearly understood from the following detailed description taken in conjunction with the accompanying drawings.

FIG. 1 is a schematic diagram illustrating an optical measurement apparatus in accordance with example embodiments.

FIG. 2 is a graph illustrating intensity of light versus time measured by the optical measurement apparatus in FIG. 1.

FIG. 3 is a graph illustrating ranges of a particle signal and a gas signal.

FIG. 4 is a flow chart illustrating an optical measurement method in accordance with example embodiments.

DETAILED DESCRIPTION OF EXAMPLE EMBODIMENTS

Hereinafter, example embodiments will be explained in detail with reference to the accompanying drawings.

Figure 1:
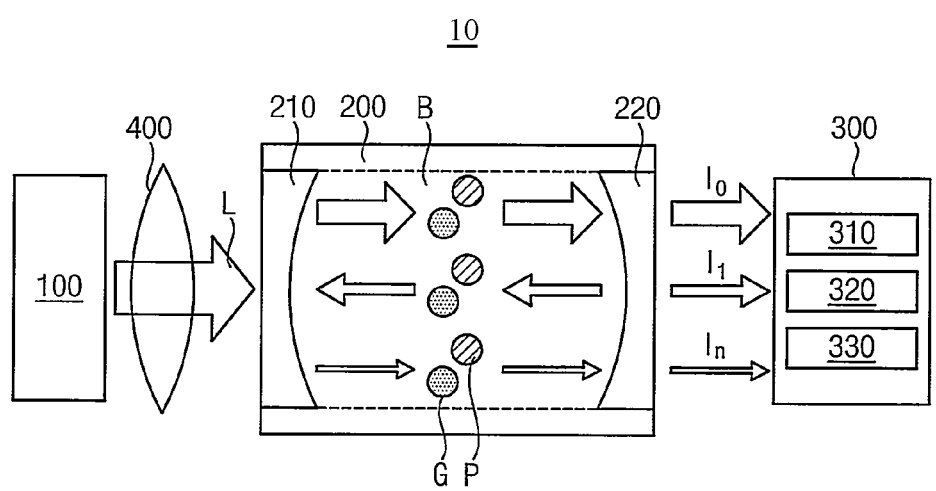
FIGS. 1 to 4 represent example embodiments as described herein.
Figure 2:
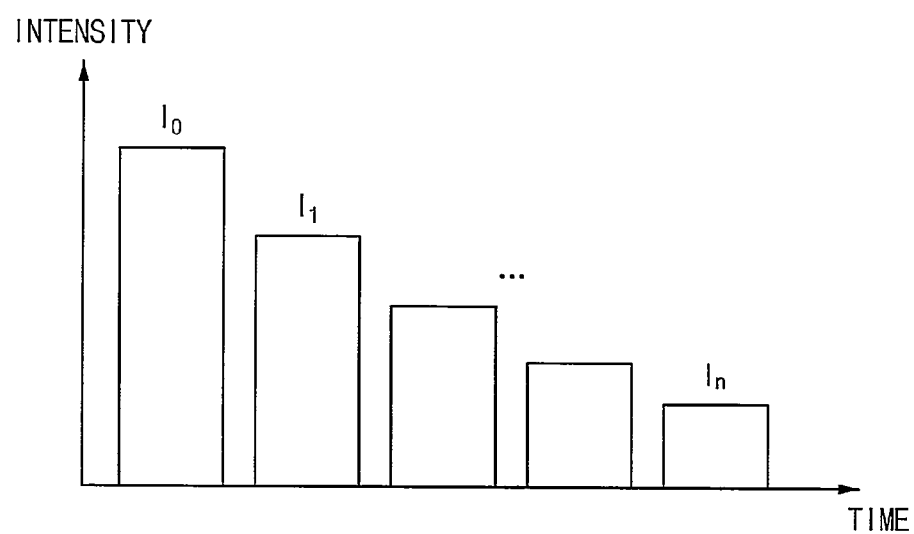
Figure 3:
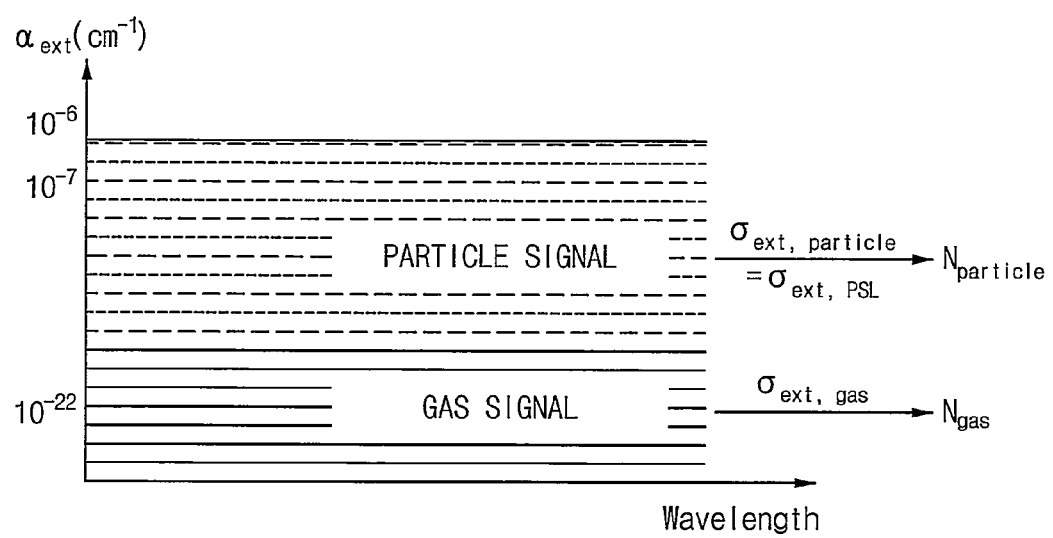
Figure 4:
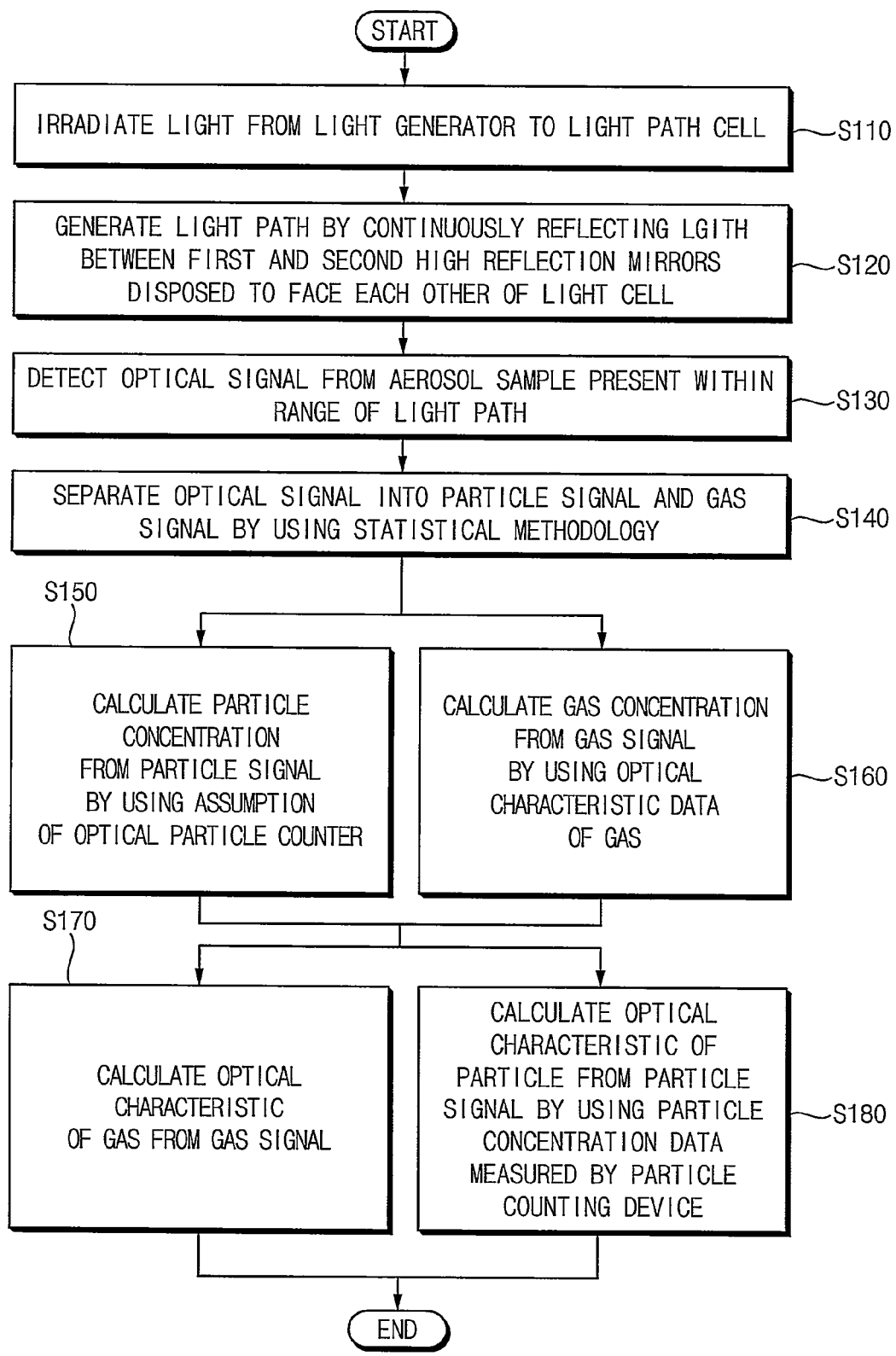

FIG. 1 is a view illustrating an optical measurement apparatus in accordance with example embodiments. FIG. 2 is a graph illustrating intensity of light versus time measured by the optical measurement apparatus in FIG. 1. FIG. 3 is a graph illustrating ranges of a particle signal and a gas signal.

Referring to FIGS. 1 to 3, an optical measurement apparatus 10 may include a light generator 100 configured to generate light, a light path cell 200 having first and second high reflection mirrors 210 and 220 that face each other to reflect incident light therebetween to generate a light path B, and a detector 300 configured to detect an optical signal from a sample present in the light path B. The optical measurement apparatus 10 may further include a lens 400.

In example embodiments, the optical measurement apparatus 10 may be an analysis apparatus for analyzing an interrelationship between physical information such as concentrations of materials, optical characteristics of the materials, etc. by using a light extinction reaction with respect to the materials present in an optical beam path (B) as will be described later. The light may be scattered and absorbed inside the optical measurement apparatus.

The optical measurement apparatus 10 may include a cavity ring-down spectrometer (CRDS). The cavity ring-down spectrometer may be a spectrometer using a phenomenon in which a portion of the light generated from a light source, entered between two mirrors and passed through various optical components is reflected and extinguished by the material present between the two mirrors. The two mirrors (Plano-concave High Reflectivity (HR) mirrors) having a same shape with one flat surface and another curved surface may face each other, and may be aligned to form a Fabry-Perot Interferometer structure.

The optical measurement apparatus 10 may analyze an aerosol (a collection of solid or liquid particles suspended in a gas) existing in the light path B. The aerosol may include a gas and a condensed phase (liquid droplets, solid particles).

The light path B of the light path cell 200 may have an open path shape exposed to an ambient environment. When the optical measurement apparatus 10 has the open path shape, the optical measurement apparatus 10 may be utilized in fields such as atmospheric science, a clean room where the need for the light path B to be exposed to the ambient environment is recognized.

When the optical measurement apparatus 10 has the open path shape, data on a gas phase sample G and a solid phase sample (particles) P present in the aerosol may be simultaneously detected by the detector 300. In this case, the data for the gas phase sample G and the solid phase sample P may be effectively separated and filtered by using algebraic and statistical methodologies.

Alternatively, the optical measurement apparatus 10 may have a closed path shape in which the optical path B is isolated from the ambient environment. When the optical measurement apparatus 10 has the closed path shape, the optical measurement apparatus 10 may further include a blocking member. A gas inside the optical measurement apparatus 10 may be cut off from an external gas by the blocking member. A gas containing impurities to be measured may be supplied to an inside of the blocking member. A pressure regulator connected to the blocking member may maintain a constant pressure within the blocking member.

The optical measurement apparatus 10 may be used in spectroscopic technology based on Beer-Lambert Law. For example, the optical measurement apparatus 10 may use single pass spectroscopy method in which the light is cast in only one direction. For example, the single pass spectroscopy method may include ultraviolet-visible spectroscopy (UV-Vis Spectroscopy), Fourier transform infrared spectroscopy (FT-IR Spectroscopy), near-infrared and far-infrared spectroscopy (NIR and Far-IR spectroscopy), terahertz spectroscopy (Terahertz (THz) Spectroscopy), sub-millimeter spectroscopy (Sub-mm Spectroscopy), and the like.

Alternatively, the optical measurement apparatus 10 may use a multi pass spectroscopy method using the first and second high reflection mirrors 210 and 220. For example, the multi pass spectroscopy method may include a Pfund Cell, a White Cell, a Herriott Cell, a Fabry-Perot Etalon/Resonator/Interferometer, and the like. The multiple pass spectroscopy method may include Cavity Ring-Down Spectroscopy (CRDS), Integrated Cavity Output Spectroscopy (ICOS), Cavity Enhanced Absorption Spectroscopy (CEAS), Cavity Attenuated Phase Shift (CAPS) Spectroscopy) and the like.

Alternatively, the optical measurement apparatus 10 may include Photoacoustic Spectroscopy (PAS), Quartz-enhanced PAS, and a mixed form in which the single pass spectroscopy and the multi pass spectroscopy are mixed in various forms.

In example embodiments, the light generator 100 may generate light of a preset wavelength according to a type of a particle to be measured. For example, the light of the preset wavelength may include ultraviolet (UV) light, visible (Visible) light, infrared (Mid-IR) light, near-infrared (Near-IR) light, far-infrared (Far-IR) light, sub-millimeter (Sub-mm) radiation, and terahertz (THz) radiation (which may each be referred to herein as "light"). The light generator 100 may generate the light having a preset frequency according to types of the gas phase sample G and the solid phase sample P of the aerosol to be measured.

The light generator 100 may direct the light L into the light path cell 200 having the first and second high reflection mirrors 210, 220. For example, the light generator 100 may direct the light to the first high reflection mirror 210 positioned adjacent to the light generator 100, and the light may pass through the first high reflection mirror 210 and be directed to the second high reflection mirror 220. Alternatively, the light generator 100 may direct the light to the lens 400, and the light may be collected and focused by the lens 400. The lens 400 may include a component that adjusts a shape and intensity distribution of the light, a component that removes retro-reflected light that is retro-reflected and induces an unwanted measurement result, etc.

The light generator 100 may stop generating an additional light through interaction (feedback) with the detector 300 while the light is directed to the first and second high reflection mirrors 210, 220 to be reflected and extinguished. Accordingly, the light generator 100 may prevent optical signal analysis data from being duplicated by the additional light. When the optical signal analysis data is calculated by the detector 300, the light generator 100 may receive a detection completion signal from the detector 300 to restart generation of the light.

In example embodiments, the first and second high reflection mirrors 210, 220 of the light path cell 200 may face each other, and reflect the light incident from the light generator 100 to generate the light path B.

For example, the first and second high reflection mirrors 210, 220 may include two mirrors having the same shape with a flat surface and a curved another surface (plano-concave high reflectivity (HR) mirrors). The first and second high reflection mirrors 210, 220 may include a Fabry-Perot interferometer structure installed facing each other.

The light may be continuously reflected between the first and second high reflection mirrors 210, 220. At each pass, the light bouncing between the first and second high reflection mirrors 210 and 220 may be partially lost by being reflected and/or collided with particles from the ambient environment. Thus, light may be lost by being scattered and absorbed between the first and second high reflection mirrors 210, 220. Each time the light is reflected by the first and second high reflection mirrors 210, 220, a portion of the light may be lost and an intensity thereof may be reduced.

The light may therefore attenuate while being reflected and collided with the gas G and the particles P existing in the light path B. Each time the light collides with the gas G and the particles P, the intensity may be reduced. The light may pass through the second high reflection mirror 220 and be incident on the detector 300.

In example embodiments, the detector 300 may include an optical signal detector 310, an electric signal converter 320 and an electric signal recorder (e.g., a digitizer, oscilloscope, computer) 330.

As illustrated in FIG. 2, the optical signal detector 310 may receive the light transmitted through the second high reflection mirror 220 by separating the light according to the number of reflected times. When the intensity of the light is arranged according to the passage of time, the intensity may gradually decrease (exponential decay) in a form of an exponential function. The optical signal detector 310 may sequentially receive the intensities classified into un-reflected light I0, once-reflected light I1, . . . , and n-times-reflected light In according to the degree of extinction. For example, the once reflected light I1 may be light transmitted through the second high reflection mirror 220 after the light reflected by the second high reflection mirror 220 is reflected by the first high reflection mirror 210. As the number of reflections increases, the intensity may decrease.

The optical signal detector 310 may receive the light of which the intensity decreases as time goes by. When the intensity of the light decreases below a preset intensity, the optical signal detector 310 may stop detecting the light and may transmit the detection completion signal to the light generator 100 such that the light generator 100 generates new light.

The electrical signal converter 320 may convert the light received from the optical signal detector 310 into an electrical signal. The electrical signal recorder 330 may record the electrical signal as the intensity of the electrical signal that decreases with the passage of time.

The electrical signal recorder 330 may interpret a loss of the intensity as a mathematical relation expression based on the Beer-Lambert Law. For example, the mathematical relational expression may include a relational expression indicating a relationship between measured values of various multipath spectrometers such as CRDS, CEAS, and CAPS, and an optical characteristics-extinction coefficient of the material. The electrical signal recorder 330 may interpret the mathematical relation expression to express an extinction coefficient αext, which is a sum of optical characteristic responses of the materials G and P in the optical path.

The electrical signal recorder 330 may classify the extinction coefficient according to an extinction step in which the intensity of the light is extinguished in an exponential function form. The electrical signal recorder 330 may express the extinction coefficient by using an optical cross-section (σext) corresponding to an intrinsic characteristic of a substance. The electrical signal recorder 330 may display the extinction coefficient as a product of the optical cross-sectional area and the aerosol concentration N, according to the extinction step. The electrical signal recorder 330 may express the extinction coefficient as in a following Equation (1).

$$\alpha_{ext} = \Sigma \sigma_{ext} \cdot N \quad \text{Equation (1)}$$

Here, αext is the extinction coefficient, σext is the optical cross-sectional area, N is the aerosol concentration.

The electrical signal recorder 330 may simultaneously measure a particle signal P and a gas signal G in the optical path.

The electrical signal recorder 330 may effectively separate the simultaneously measured signals into the particle signal and the gas signal by using algebraic and statistical methodologies, and the separated particle signal may be converted into a particle concentration in the optical path by using an assumption of an optical particle counter (OPC). The electrical signal recorder 330 may measure the particle concentration and a gas concentration at the same time by converting the separated gas signal into the gas concentration using optical characteristics of the gas that are known in the art.

The assumption of the optical particle counter may include conditions that all particles are spherical, all particles have a density of 1 g/cm³, and all particles have optical refraction and absorption constant (refractive indices, m=n+ki). For example, m of the refraction and absorption constant may be a refractive index, n may be the refractive index that determines the speed of light in a medium, and k may be an attenuation coefficient indicating attenuation of light. Here, i may be a complex number.

The particle concentration in the light path may be measured by using the assumption of the optical particle counter. For example, the assumption of the optical particle counter may be a case in which the particle in the optical path is assumed to be poly-styrene latex (PSL). The poly-styrene latex may be referred to as particles defined as a standard when measuring the particles in the clean room or indoor environment.

Alternatively, the assumption of the optical particle counter may assume that a target particle to be measured in the optical path is a particle in the optical path. For example, the target particle may include metal or organic ultrafine dust (PM 2.5 or less) that may be measured in the clean room of a semiconductor process.

The signals measured by the electrical signal recorder 330 may be interpreted as a product of the optical cross-sectional area and the concentration of Equation (1), and the optical cross-sectional area may be calculated by substituting the aerosol size, the wavelength of the light and the refractive and absorption constant called optical constants into a relational expression according to the Mie theory or Rayleigh theory as will be described later.

The optical cross-sectional area may be calculated from a particle size or a size of gas molecule, the wavelength of the light, and the optical constants using the Mie theory or the Rayleigh theory, which represents a scattering and absorption relationship of particles or gases and electromagnetic waves, and the measured signal may be converted into the particle concentration or the gas concentration. As an Equation (2), which will be described later, the optical gas signal and the optical particle signal separated by the algebraic and statistical methodologies may be expressed as a relationship that merges with each other, and through this, the particle concentration and the gas concentration may be simultaneously measured.

For example, although there is no boundary point of a definite size, the Mie theory may be applied to the case where the wavelength of the electromagnetic wave is similar to a cross-sectional circumference of a spherical particle or is moderately larger or smaller. The Rayleigh theory may be applied when the wavelength of the electromagnetic wave is much smaller than the cross-sectional circumference of the spherical particle.

The electrical signal recorder 330 may measure the optical characteristics of the particles and the optical characteristics of the gas. For example, the electrical signal recorder 330 may determine the type, mass, volume, density (concentration), optical characteristics, etc., of the particle by using the optical characteristic of the particle. The electrical signal recorder 330 may determine the type, mass, volume, density (concentration), optical characteristics, etc., of the gas by using the optical characteristics of the gas.

The electrical signal recorder 330 may use the optical cross-sectional area to calculate the extinction coefficient measured by the electrical signal converter 320 as in following Equation (2) to determine the optical characteristics of the material (σext, particle) and the concentration of the material (N particle).

$$\alpha_{ext} = \Sigma \sigma_{ext} \cdot N = \Sigma (\sigma_{ext,particle} \cdot N_{particle} + \sigma_{ext,gas} \cdot N_{gas}) \quad \text{Equation (2)}$$

Here, αext is the extinction coefficient, σext is the optical cross-sectional area, N is the aerosol concentration, "σext, particle" is the optical characteristic of a solid or liquid particle, N particle is the concentration of solid or liquid particles, "σext, gas" is the optical characteristic of the gas, and N gas is the concentration of the gas.

As illustrated in FIG. 3, the extinction coefficient may be divided into an electrical signal for particles and an electrical signal for gas. The electrical signal for the particle may be expressed as a product of the particle concentration (N particle) and the optical characteristic of the particle (σext, particle). The electrical signal for the gas may be expressed as a product of the gas concentration (N gas) and the optical characteristic of the gas (σext, gas).

The electrical signal recorder 330 may extract the particle concentration by separating the particle concentration and the gas concentration in the optical path B. Accordingly, the electrical signal recorder 330 may simultaneously calculate the particle concentration, the optical characteristic of the particles, the gas concentration, and the optical characteristic of the gas in the one optical path B.

As described above, the particle concentration may be calculated together with the gas concentration from the aerosol sample within the range of the light path B between the first and second high reflection mirrors 210, 220 by using the assumptions of the optical particle counter. Accordingly, it may be possible to simultaneously measure a particle count and the gas contamination concentration to a level that satisfies accuracy required in a semiconductor clean room. In addition, since a function of a gas concentration meter and a function of a particle counter are simultaneously performed, the equipment cost may be reduced, and thermodynamic and kinetic studies of reaction and transformation between particles and gases may be possible.

Hereinafter, an optical measurement method using the optical measurement apparatus in FIG. 1 will be explained.

FIG. 4 is a flow chart illustrating an optical measurement method in accordance with example embodiments.

Referring to FIGS. 1 to 4, first, light may be directed from a light generator to a light path cell (S110).

In example embodiments, the light generator 100 may generate the light of a preset wavelength according to a type of particles to be measured. For example, the light of the preset wavelength may include ultraviolet (UV) light, visible (Visible) light, infrared (Mid-IR) light, near-infrared (Near-IR) light, far-infrared (Far-IR) light, sub-millimeter (Sub-mm) radiation, and terahertz (THz) radiation. The light generator 100 may incident the light of the preset wavelength on a first high reflection mirror 210 installed adjacent to the light generator 100.

Then, a light path may be generated by continuously reflecting the generated light between first and second high reflection mirrors of the light path cell that face each other (S120).

In example embodiments, the light path cell 200 generating the light path may include a structure of an open path type in which the optical path is exposed to the ambient environment. The open pass type may be used in fields such as atmospheric science and clean room. Alternatively, the light path may be directed inside a cell having a closed path type.

The light incident from the light generator 100 may be reflected between the first and second high reflection mirrors 210, 220 to generate the light path B. For example, a distance between the first and second high reflection mirrors may be within a range of 0.1 m to 1.5 m to achieve a stable resonator cavity, corresponding to a degree (e.g., curvature) of a concave portion of the mirror. The light path may be formed in a clean room environment.

Then, an optical signal may be detected from an aerosol sample present within a range of the light path (S130).

In example embodiments, in order to detect the optical signal, data on a gas phase sample G and a solid phase sample P inside an aerosol existing on the optical path B may be detected. For example, the aerosol may include a gas and a condensed phase (e.g., liquid droplets, solid particles).

Then, the optical signal may be separated into a particle signal and a gas signal by using a statistical methodology (S140).

In example embodiments, to separate the optical signal into the particle signal and the gas signal, an extinction coefficient (αext) may be expressed using a Beer-Lambert Law for extinction of the light. The extinction coefficient may be expressed using an optical cross-section (σext), which is an intrinsic characteristic of a material.

Then, a particle concentration may be calculated from the particle signal by using an assumption of an optical particle counter (S150), and a gas concentration may be calculated from the gas signal by using optical characteristic data of gas (S160).

In example embodiments, the assumption of the optical particle counter may include conditions that all particles are spherical, all particles have a density of 1 g/cm 3, and all particles have optical refraction and absorption constants (m=n+ki). For example, the optical characteristic data of the gas may be referred to as data including optical characteristic of the gas that are known in the art.

Calculating the particle concentration (N particle) and the optical characteristic of the particle (σext, particle) may be calculated by separating the extinction coefficient into an electrical signal for the particles and an electrical signal for the gas. The electrical signal for the particle may be expressed as a product of a particle concentration (N particle) and an optical characteristic (σext, particle) of the particle.

Calculating the particle concentration (N particle) and the optical characteristic (σext, particle) of the particle may extract the particle concentration by separating the particle concentration and the gas concentration in the optical path B. Accordingly, the particle concentration and the optical characteristic of the particle in the one optical path B may be simultaneously calculated together with the gas concentration and the optical characteristic of the gas.

The extinction coefficient may be interpreted as a product of an optical cross-sectional area and an aerosol concentration of Equation (1), and the optical cross-sectional area may be calculated by substituting an aerosol size, a wavelength of the light, and the refraction and absorption constants called optical constants into relational expressions according to the Mie theory or Rayleigh theory. The optical cross-sectional area may be calculated from a particle size or gas molecule size, light wavelength, and optical constant by using the Mie theory or the Rayleigh theory to represent a scattering and absorption relationship of the particles or the gases and electromagnetic waves, and the measured optical signal may be converted into the particle concentration or the gas concentration. The optical gas signal and optical particle signal separated by algebraic and statistical methodologies as in Equation (2) may be expressed as a relationship that merges with each other, and through this, the particle concentration and the gas concentration may be measured simultaneously. For example, although there is no boundary point of a definite size, the Mie theory may be applied to the case where the wavelength of the electromagnetic wave is similar to a cross-sectional circumference $2\pi r$ of a spherical particle or is moderately larger or smaller. The Rayleigh theory may be applied when the wavelength of the electromagnetic wave is much smaller than the cross-sectional circumference $2\pi r$ of the spherical particle.

Then, an optical characteristic of the gas may be calculated from the gas signal (S170), and an optical characteristic of a particle may be calculated from the particle signal by using particle concentration data measured by a particle counting device (S180).

In example embodiments, the gas concentration and the optical characteristic of the gas may be calculated from the optical cross-sectional area that is separated into the electrical signal for the particle and an electrical signal for the gas. The electrical signal for the gas may be expressed as a product of the gas concentration and the optical characteristic of the gas.

Calculating the gas concentration (N gas) and the optical characteristic of the gas ($\sigma$ext, gas) may be calculated by separating the extinction coefficient into the electrical signal for particles and the electrical signal for gas. The electrical signal for the gas may be expressed as a product of the gas concentration (N gas) and the optical characteristic of the gas ($\sigma$ext, gas).

The foregoing is illustrative of example embodiments. Although various example embodiments have been described herein, those skilled in the art will readily appreciate that many modifications are possible in example embodiments without materially departing from the novel teachings and aspects of the present disclosure. Accordingly, all such modifications are intended to be included within the scope of example embodiments.

What is claimed is:

1. A method for performing optical measurement, comprising:
    directing light from a light generator to a light path cell;
    generating a light path by continuously reflecting the light directed from the light generator between first and second high reflection mirrors of the light path cell that face each other;
    detecting an optical signal from an aerosol sample present within the light path, the aerosol sample including a gas and solid and/or liquid particles suspended within the gas;
    separating the optical signal into a particle signal representing the solid and/or liquid particles suspended in the gas and a gas signal representing the gas by using a statistical methodology;
    calculating a particle concentration representing the solid and/or liquid particles suspended in the gas from the particle signal by using an assumption about characteristics of the solid and/or liquid particles for implementing an optical particle counter (OPC); and
    calculating a gas concentration representing the gas from the gas signal by using optical characteristic data of gas,
    wherein the calculating of the particle concentration representing the solid and/or liquid particles suspended in the gas and the calculating of the gas concentration are performed simultaneously, and
    wherein separating the optical signal into the particle signal and the gas signal includes expressing a light intensity as an extinction coefficient using the Beer-Lambert Law and separating the particle signal and the gas signal by using algebraic and statistical methodologies.

2. The method of claim 1, wherein the assumption of the optical particle counter includes conditions that all particles are spherical, all particles have a density of 1 g/cm³, and all particles have optical refraction and absorption constants (m=n+ki), where m is a refractive index, n determines speed of light within a medium, k is an attenuation coefficient indicating attenuation of light, and i is an intensity of light.

3. The method of claim 1, further comprising:
    calculating an optical characteristic of a particle from the particle signal by using particle concentration data measured by a particle counting device; and
    calculating an optical characteristic of the gas from the gas signal by using gas concentration data measured by a gas concentration measuring device.

4. The method of claim 1, wherein the light generator generates the light of a preset wavelength according to a type of a particle to be measured, and
    wherein the light of the preset wavelength includes ultraviolet (UV) light, visible (Visible) light, infrared (Mid-IR) light, near-infrared (Near-IR) light, far-infrared (Far-IR) light, sub-millimeter (Sub-mm) radiation, and/or terahertz (THz) radiation.

5. The method of claim 1, wherein calculating the particle concentration uses the assumption of the optical particle counter and Mie theory or Rayleigh theory representing a scattering relationship of particles and electromagnetic waves.

6. The method of claim 1, wherein the light path is generated by single pass spectroscopy, multi pass spectroscopy, and/or mixed spectroscopy of the single pass spectroscopy and the multi pass spectroscopy.

7. The method of claim 1, wherein generating the light path includes generating the light path in an open path shape in which the light path is exposed to an ambient environment.

8. The method of claim 1, wherein a distance between the first and second high reflection mirrors is within a range of 0.1 m to 1.5 m.

9. The method of claim 1, wherein the light path is formed in a clean room environment, an atmospheric environment, and/or an indoor environment.

10. An optical measurement apparatus, comprising:
    a light generator configured to generate light;
    a light path cell having first and second high reflection mirrors that face each other to generate a light path by reflecting the light from the light generator; and
    a detector configured to simultaneously measure a particle concentration, representing solid and/or liquid particles suspended in a gas, and a gas concentration, representing the gas within which the solid and/or liquid particles are suspended, in the light path by using an assumption about characteristics of the solid and/or liquid particles for implementing an optical particle counter (OPC),
    wherein the detector expresses a light intensity as an extinction coefficient by using the Beer-Lambert Law, and measures the particle concentration and the gas concentration by using algebraic and statistical methodologies.

11. The optical measurement apparatus of claim 10, wherein the assumption of the optical particle counter includes conditions that all particles are spherical, all particles have a density of 1 g/cm³, and all particles have optical refraction and absorption constants (m=n+ki), wherein m is a refractive index, n determines speed of light within a medium, k is an attenuation coefficient indicating attenuation of light, and i is an intensity of light.

12. The optical measurement apparatus of claim 10, wherein the detector measures an optical characteristic of a particle and an optical characteristic of gas.

13. The optical measurement apparatus of claim 10, wherein the detector separates the particle concentration and the gas concentration in the light path to extract the particle concentration.

14. The optical measurement apparatus of claim 10, wherein the light generator generates the light of a preset wavelength according to a type of a particle to be measured, and wherein the light of the preset wavelength includes ultraviolet (UV) light, visible (Visible) light, infrared (Mid-IR) light, near-infrared (Near-IR) light, far-infrared (Far-IR) light, sub-millimeter (Sub-mm) radiation, and/or terahertz (THz) radiation.

15. The optical measurement apparatus of claim 10, wherein the detector simultaneously measures the particle concentration and the gas concentration by using the assumption of the optical particle counter and Mie theory or Rayleigh theory representing a scattering relationship of particles and electromagnetic waves.

16. The optical measurement apparatus of claim 10, wherein the light path has an open path shape exposed to an ambient environment.

17. The optical measurement apparatus of claim 10, wherein a distance between the first and second high reflection mirrors is within a range of 0.1 m to 1.5 m.

18. A method of optical measurement, the method comprising:

emitting light from a light generator;

generating a light path by continuously reflecting the light emitted from the light generator between first and second high reflection mirrors that are open to an ambient environment;

detecting an optical signal from an aerosol sample present within the light path, the aerosol sample including a gas and solid and/or liquid particles suspended within the gas;

separating the optical signal into a particle signal representing the solid and/or liquid particles suspended in the gas and a gas signal representing the gas;

calculating a particle concentration representing the solid and/or liquid particles suspended in the gas and optical characteristic of the particles from the particle signal by using particle concentration data measured by a particle counting device; and calculating a gas concentration representing the gas and optical characteristic of gas from the gas signal by using gas concentration data measured by a gas concentration measuring device, wherein the calculating of the particle concentration representing the solid and/or liquid particles suspended in the gas and the calculating of the gas concentration are performed simultaneously, and wherein separating the optical signal into the particle signal and the gas signal includes expressing a light intensity as an extinction coefficient using the Beer-Lambert Law and separating the particle signal and the gas signal by using algebraic and statistical methodologies.

* * * * *